United States Patent [19]
Rinker

[11] Patent Number: 5,425,188
[45] Date of Patent: Jun. 20, 1995

[54] SUCTION EXCAVATOR

[75] Inventor: Karl Rinker, Bad Schönborn, Germany

[73] Assignee: VMB Vesta Maschinenbau GmbH Co. KG, Rheinstetten, Germany

[21] Appl. No.: 202,227

[22] Filed: Feb. 25, 1994

[30] Foreign Application Priority Data

Feb. 27, 1993 [DE] Germany .......... 43 06 135.4

[51] Int. Cl.⁶ .......... E02F 3/88; E02F 3/92; E02F 13/90; E02F 1/28
[52] U.S. Cl. .......... 37/317; 175/66; 175/206; 299/17; 405/248; 405/249; 37/315; 37/905
[58] Field of Search .......... 37/315, 316, 317, 189; 209/134, 135, 142, 143, 421, 710; 175/66, 67, 206; 299/16, 17; 405/248, 249

[56] References Cited

U.S. PATENT DOCUMENTS

| | | | |
|---|---|---|---|
| 2,774,569 | 12/1956 | Jacobsen | 255/24 |
| 3,612,193 | 10/1971 | Hirata | 175/91 |
| 3,842,461 | 10/1974 | Wurster | 209/142 X |
| 3,930,324 | 1/1976 | Wightman et al. | 37/189 |
| 5,016,717 | 5/1991 | Simons et al. | 175/66 |

FOREIGN PATENT DOCUMENTS 0368129 1/1989 European Pat. Off. .
3227340 7/1982 Germany .

Primary Examiner—Randolph A. Reese
Assistant Examiner—Robert Pezzuto
Attorney, Agent, or Firm—Antonelli, Terry, Stout & Kraus

[57] ABSTRACT

The invention relates to an excavator for suction material, particularly for removing soil from underground pipes. The excavator has a pneumatic elephant trunk for removing the suctioned material and which issues into a storage tank for the suctioned material and to which is connected an exhaust fan. In the storage tank the suctioned material is separated from the suction air flow and is subsequently passed through a filter positioned between an elephant trunk opening and the exhaust fan. In order to ensure a good separation on the part of the filter for a long period of time, the filter is formed by a coarse filter and a fine filter connected to the latter. The coarse filter is formed by a labyrinth or cascade-like flow channel, which is bounded by reciprocally displaced partitions and whose flow cross-section increases in the flow direction. On the tank bottom can be provided a conveyor by which the suctioned material separated from the air flow can be removed continuously or at intervals from the storage tank.

21 Claims, 3 Drawing Sheets

SUCTION EXCAVATOR

FIELD OF THE INVENTION

The invention relates to a suction excavater for suctioning material, particularly for the planned excavation of soil with respect to pipes laid in the ground, having a pneumatic elephant trunk for removing the suctioned material, a storage tank for the sucked up material and into which issues the elephant trunk and in which the suctioned material is separated from the suction air flow, with an exhaust fan being connected to the storage tank and a filter means being positioned between the opening of the elephant trunk in the suction tank and the exhaust fan.

BACKGROUND OF THE INVENTION

When working on already laid pipes normally conventional shovel excavators are used in pipeline construction. Working with shovel excavators is particularly disadvantageous when it is a question of laying bare a specific point on underground pipes, e.g. in order to remove pipe breaks, connect branches or to inspect the pipes. As a result of the operation of a shovel excavator it is necessary to remove the soil in a large area and deposit the overburden on the building site. Due to the relatively approximate operation and poor controllability of the shovels, there is a considerable risk of damage to the pipes to be layed bare or those adjacent thereto. In the case of medium-carrying pipes such as gas, water or sewage pipes, this can lead to the escape of the medium and in the case of electric cables to the destruction thereof.

For the planned removing of material so-called suction excavators have been developed, in which with the aid of a fan a vacuum is produced and the material can be suctioned an elephant trunk into a storage tank, where the suction material is separated from the suction air flow, while filtering out dust or other particles contained in the conveying air, before the latter is blown out at the fan outlet side. It has been found that filters in such suction excavators become relatively rapidly blocked by particles entrained in the suction air flow, which impedes or even prevents the suction process.

It is known (EP 368 129 C2) to clean the filters in a continuous manner by supplying water and/or air, but the cleaning capacity obtained is dependent on the nature of the particles entrained in the suction air flow. Particularly in the case of loam or other strongly adhering particles, it is very difficult to keep the filters free over long periods and consequently ensure a relatively long-lasting, trouble-free operation of the suction excavator.

SUMMARY OF THE INVENTION

The aim of the invention is to provide an excavator for the planned removal of material by suction and, in particular, for the removal of soil, while ensuring over a long time period a good separation of the suctioned material.

According to the invention, the filter means comprises a coarse filter and a fine filter connected thereto, with the coarse filter being formed by a labyrinth or cascade-like flow channel, which is bounded by reciprocally displaced partitions and whose flow cross-section increases in the flow direction. After the suction air flow has entered the storage tank by means of the elephant trunk together with the entrained suctioned material, a first preliminary separation takes place therein due to gravity. The particles still present in the suction air flow are entrained by the conveying air into the labyrinth-like flow channel forming the coarse filter and in which the suction air flow is strongly deflected a number of times. As a result of their greater mass compared with the conveying air the entrained particles have a greater inertia, so that they either do not follow or only follow to a limited extent the deflections of the suction air flow. Therefore the particles strike against the sides or partitions and drop from the latter onto the bottom of the storage tank, so that they are separated from the suction air flow. Therefore, the coarse filter is able to remove from the suction air flow significant proportions of the suction material. Those particles which, as a result of their relatively low mass, can follow the deflections in the labyrinth-like flow channel, are retained in the following fine filter, from which they can be cleaned in a conventional manner by air and/or water.

The flow channel cross-section increases in the flow direction. This makes it possible to ensure that the air velocity in the flow channel continuously decreases and the suction material constituents entrained in the air flow are deposited on the partitions and can drop in a downward direction. The flow cross-section of the flow channel can either continuously increase or alternatively, the partitions may be arranged with a varying spacing, so that the flow cross-section sectionally increases.

According to a preferred embodiment the partitions are arranged substantially vertically and parallel to one another. Thus, it is possible to bring about a multiple deflection of the flow channel within a relatively small area within the storage tank.

According to an advantageous development of the invention, the deflections of the flow channel alternately take place close to the upper wall and close to the bottom of the storage tank. Thus, the suction air flow within the coarse filter moves substantially vertically up and down, so that the gravity assists the separation of the entrained particles. The flow channel inlet is preferably positioned close to the upper wall of the storage tank, so that between the opening of the elephant trunk into the storage tank and the entrance into the flow channel an effective preliminary separation can take place.

The number of flow channel deflections is essentially dependent on the sphere of use of the suction dredger. However, it has been found that the suction air flow should be deflected at least three times by 180° in order to obtain for the soil a high separation or extraction capacity.

The fine filter is preferably formed by several filtering bags through which a flow takes place. Filtering bags are known and have proved satisfactory for the separation or retention of dust or dust-like particles. To facilitate the cleaning of the filtering bags, the latter are preferably substantially vertically oriented and the flow through them is from bottom to top. The particles retained on the filtering bags, on becoming detached therefrom, drop downwards onto the bottom of the storage tank. In addition, this arrangement leads to the further advantage that the filtering bags can be easily cleaned. For this purpose the filtering bags are provided at their upper end with air and/or water nozzles by which the bags can be rinsed or blown out under pressure. By the nozzles the filtering bags can be cleaned continuously or at intervals and the retained particles, following release from the filtering bags, drop onto the bottom of the storage tank.

For improving the filtering bag cleaning possibilities, the bags can be fitted to a support frame mounted in floating manner. If the support frame is vibrated by a vibrating mechanism, e.g. a rotating cam or an unbalance motor, the filtering bags can additionally be shook out, so that the filter walls do not become stuck over with suctioned material. The floating mounting of the support frame can e.g. be brought about by a spring suspension or a corresponding mounting support. The filtering bags hung on the support frame can be removed or replaced as a unit for external cleaning purposes.

The particles which have been held back during preliminary separation in the labyrinth-like flow channel and the filtering bags, pass onto the bottom of the storage tank. Therefore tank fills relatively rapidly, if it is not given an adequately large volume. In order to ensure a continuous operation of the suction dredger over a long period of time in the case of relatively small and compact storage tanks, according to the invention on the bottom of the tank is provided a conveying mechanism by which the suction material separated from the air flow can be removed from the tank. In this way the storage tank can be emptied continuously or at intervals, so that the suction dredger operation is not limited by the tank volume. Preferably the conveyor mechanism is formed by a screw conveyor, which e.g. runs in the longitudinal direction of the dredger.

In order to be able to remove the separated suctioned material in simple manner from the storage tank, according to a preferred development of the invention, with the conveying-side end of the screw conveyor is associated an opening in the bottom of the tank through which the separated suctioned material drops onto a transporting means located below it. The opening is preferably positioned close to the rear end of the storage tank, so that the conveyor mechanism can continuously convey the separated suctioned material over the entire bottom of the tank. The opening is preferably closable by a cover or a slide, so that if necessary the suctioned material can be retained in the tank.

The transporting mechanism is appropriately constituted by a conveyor belt, which permits a continuous removal of the suctioned material. In order to be able to deposit the suctioned or conveyed material on the ground on different sides of the dredger, the conveyor belt can be pivotably fitted to the dredger chassis. In each pivoting or swivelling position a portion of the conveyor belt remains below the opening in the tank bottom, so that suctioned material dropping through the opening reliably passes onto the conveyor belt. It has proved appropriate for the pivotable conveyor belt to cover a pivoting range of approximately 180°, so that the suctioned material can be dumped either alongside or to the rear of the dredger.

It is alternatively also possible to construct the conveyor belt as a stationary belt and in the preferred development at the free end of first conveyor belt is provided a further, second conveyor belt and the suctioned or conveyed material can be transferred from the first to the second conveyor belt. With such a construction the second conveyor belt can be pivotably fitted to the dredger chassis, so that, as required, the suctioned or conveyed material can be dumped on different sides of the dredger.

In order to ensure that the second conveyor belt does not project excessively from the chassis on moving the dredger, the conveyor belt is preferably displaceable relative to the chassis. In this way the conveyor belt can be moved into an inoperative position located on the chassis, where it is reliably held and does not project from the suction dredger.

It is admittedly fundamentally possible for the suction air flow to be introduced directly into the labyrinth-like flow channel from the opening of the elephant trunk into the storage tank, but it has proved advantageous for it to flow through a settling chamber of the tank, where a preliminary separation takes place, prior to entering the flow channel. The settling chamber should be positioned upstream of the filter means. As a function of the nature of the suctioned material, the preliminary separation separates a high proportion of the particles entrained in the suction air flow in the settling chamber. Therefore, the settling chamber capacity substantially defines the duration of the continuous operation of the suction dredger. According to a preferred development of the invention the settling chamber is subdivided by a partition into two portions and flow guidance means are provided by which the suction air flow passing through the elephant trunk opening into the storage tank can be introduced into one or other of the two tank portions. The flow guidance means are preferably constituted by pivotable flaps or the like. If in this construction the suction air flow flows through one tank portion and this is gradually filled due to the separation of particles, the other tank portion can be emptied. If one tank portion is full, by shifting the flow guidance means the suction air flow can now be passed through the empty tank portion, whilst the filled tank portion is emptied. Due to this interaction between filling and emptying the individual tank portions, a continuous suction dredger operation is made possible. A constructionally simple possibility for emptying the individual tank portions is obtained if each portion has at its lower end a closable opening, through which the separated suction material drops onto a transporting means located below it.

It has also proved advantageous in this construction to use as the transporting means a conveyor belt, which is optionally pivotably fitted to the excavator chassis and/or is displaceable relative thereto.

BRIEF DESCRIPTION OF THE DRAWINGS

The invention is described in greater detail hereinafter relative to non-limitative embodiments and the attached drawings, wherein.

DETAILED DESCRIPTION.

Figure 1:
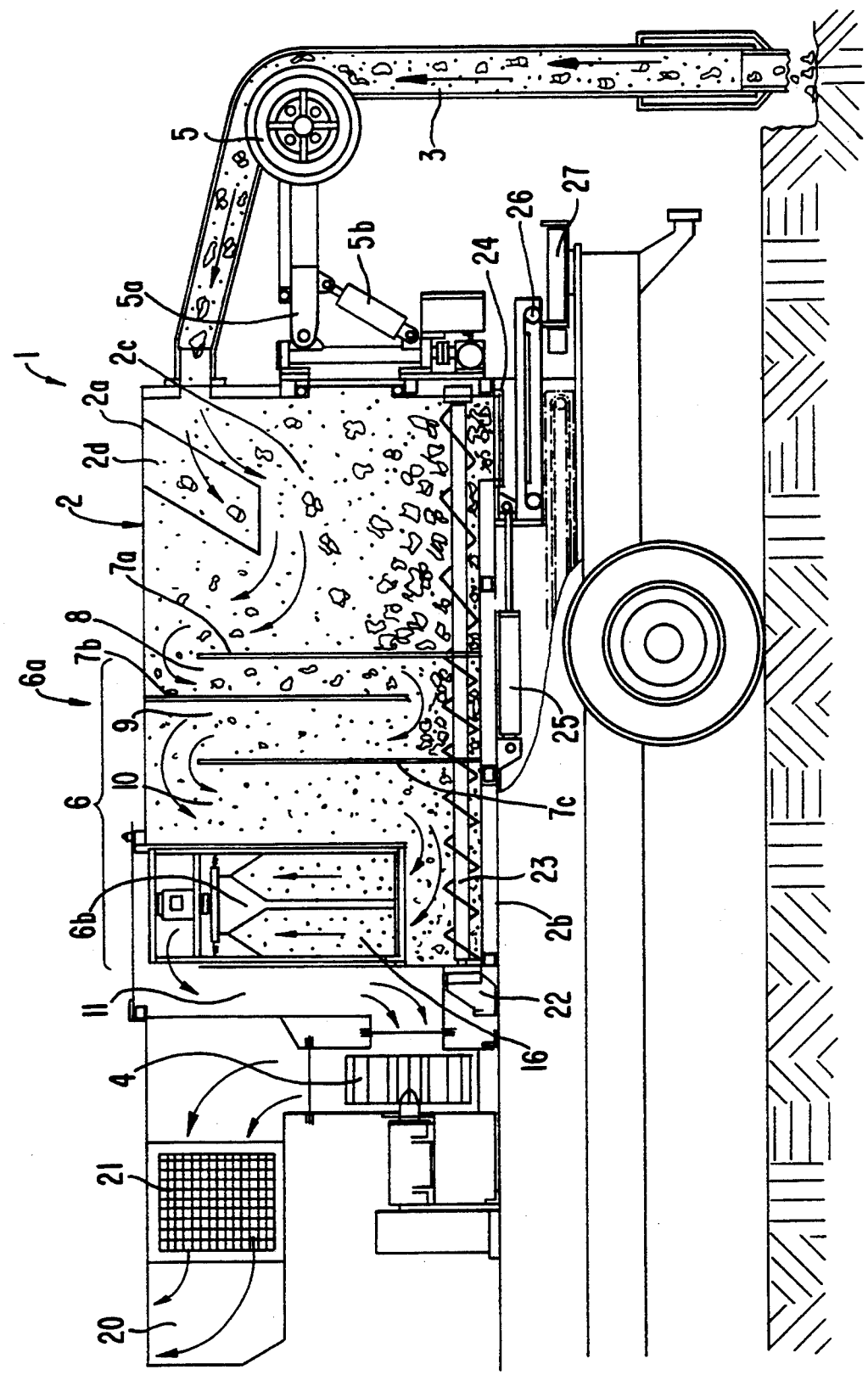
FIG. 1 is a schematic cross-sectional view of an embodiment of a suction excavator constructed in accordance with the present invention.

The suction excavator FIG. 1 has a chassis on which is located a storage tank 2 with an elephant trunk 3 connected at the rear side and a suction or exhaust fan 4. The exhaust fan 4 is connected by a pipe 11 in the upper area of the storage tank 2 and delivers air into the atmosphere by a blowoff box 20, in which is fitted a sound absorber or muffler 21.

At the upper end of the storage tank 2, opposite to the connection of the pipe 11, the elephant trunk 3 issues into the tank 2. The elephant trunk 3 is made from a flexible, stiffened material and is led downwards by a hose reel. At its lower end the elephant trunk 3 has a breaking up tool (not shown), which is surrounded by a wire guard.

The hose reel 5 is mounted in rotary manner at the free end of an arm 5a, which is raisable and lowerable on a column about a horizontal transverse axis by a lifting cylinder 5b. In addition, the column is rotatable about a vertical axis by a pivoting or swivelling motor. In this way the elephant trunk or the breaking up tool can assume different positions relative to the tank 2.

The soil loosened by the breaking up tool is suctioned by the vacuum produced by the exhaust fan 4 in the tank 2 and in the elephant trunk 3 and is conveyed into a settling chamber 2c of the tank 2. Immediately behind the opening of the elephant trunk 3 in the settling chamber 2c is provided an apron 2d acting as a separator, which downwardly deflects the conveying air and the material conveyed by it. A larger part of the suctioned material entrained in the suction air flow is consequently separated in the settling chamber 2c.

On its left-hand side in FIG. 1, the settling chamber 2c is bounded by a partition 7a, which in its upper area close to the upper wall 2a of the storage tank 2 forms an inlet in a labyrinth-like flow channel, which is formed by several vertically and parallel displaced partitions 7a, 7b and 7c. Between the walls 7a and 7b the suction air flow is led downwards from the upper wall 2a of the tank 2 into the vicinity of the tank bottom 2b, where it can enter the intermediate space formed between the partitions 7b and 7c. In the space the suction air flow again flows vertically upwards into the vicinity of the upper wall 2a of the tank 2, where it is once again deflected downwards, before entering a fine filter 6b in the vicinity of the tank bottom 2b. The flow channel portions 8, 9 and 10 formed between the partitions 7a, 7b and 7c consequently constitute a coarse filter 6a, where the particles still entrained in the suction air flow are separated to a greater extent. The cross-section of the flow channel portions 8, 9, 10 increases in the flow direction, so that the flow velocity decreases.

Figure 2:
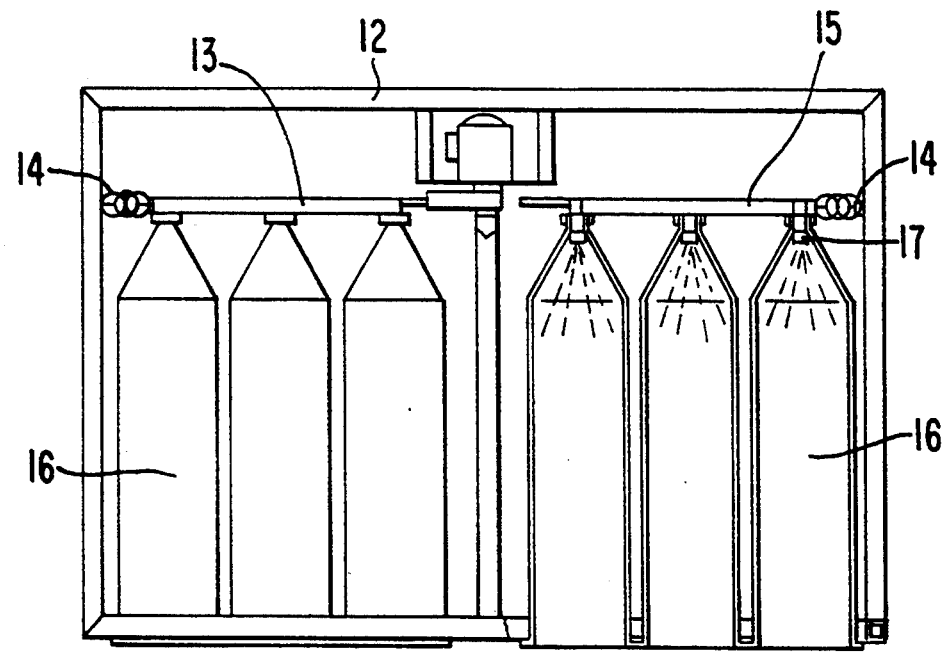
FIG. 2 is a schematic plan view of a fine filter of the excavator of FIG. 1.
Figure 2A:
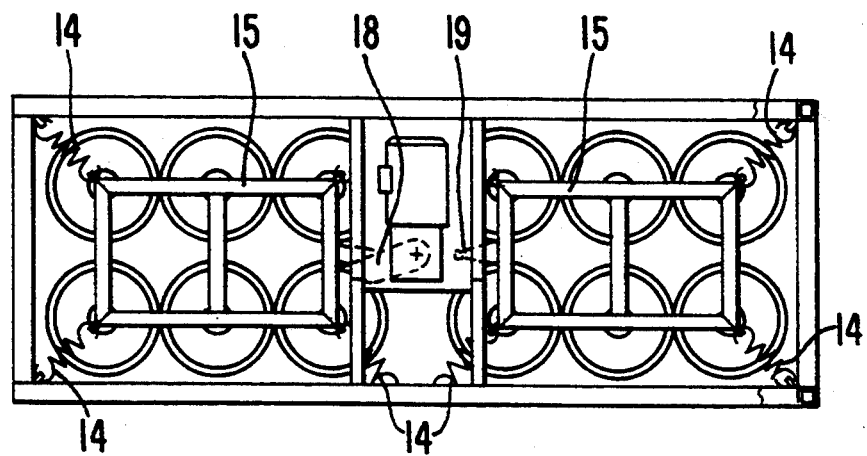
FIG. 2A is a schematic top view of the fine filter of FIG. 2.

The fine filter 6b comprises several vertically arranged filtering bags 16, through which there is a flow from bottom to top and which are held at their upper ends on a support frame 15 (FIGS. 2 and 2A). The support frame 15 is mounted in floating manner by the springs 14 on a fixed frame 12 and can be vibrated with the aid of a rotated cam disk 18 by cams 19. In this way it is possible to shake out the filtering bags 16, so as to prevent the filter walls becoming clogged with suctioned material.

In addition, in the upper portion of each filtering bag 16 are provided water and/or air nozzles 17, so that the bags can be rinsed or blown out under pressure.

The particle-cleaned air passing out of the fine filter 6b is sucked by the exhaust fan 4 by the chamber 11 and delivered to the ambient air via the blowoff box 20.

On the bottom of the storage tank 2, i.e. the settling chamber 2c, of the coarse filter 6a and below the fine filter 6b is positioned a screw conveyor 23, which is rotated by a motor. The screw conveyor 23 conveys the separated suctioned material deposited on the bottom to an opening 24 formed at the rear end of the tank and which can be opened and closed by a hydraulic cylinder 25. Below the opening 24 is positioned a first conveyor belt 26, which removes the suctioned material dropping through the opening 24 and conveys it to the rear end of the vehicle frame, where it is transferred to a second conveyor belt 27. The second conveyor belt 27 is mounted in rotary and displaceable manner on the vehicle frame, so that the suctioned material applied to the conveyor belt can be conveyed either rearwards or to the right or left vehicle side. If necessary, the conveyor belt 27 can be emptied into conveying trays, onto a vibrating screen or along the building site to a further processing station.

The conveyor belt 27 is displaceable longitudinally and transversely relative to the vehicle frame, so that it can be brought into the position shown in broken line in FIG. 1.

Figure 3:
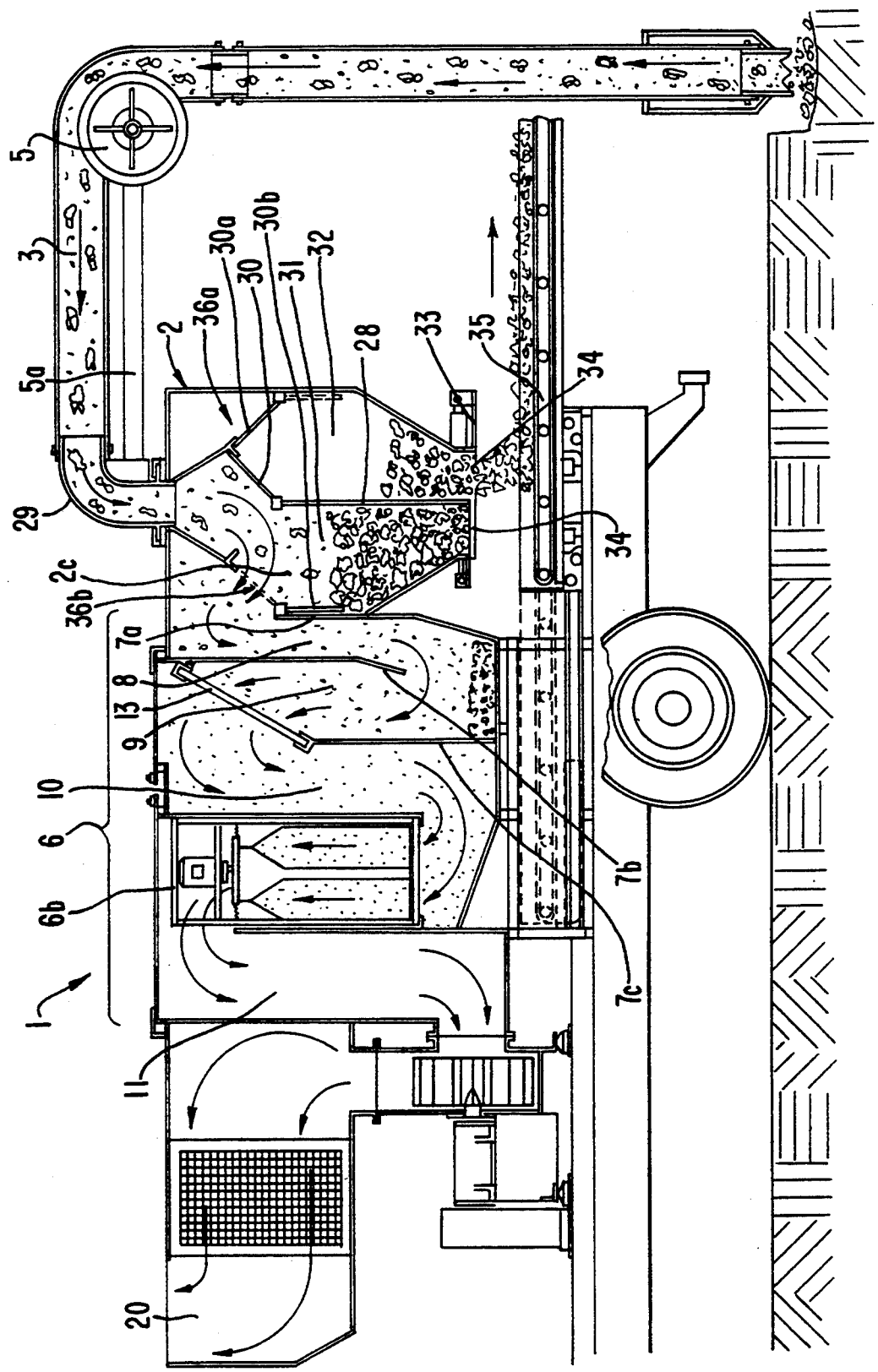
FIG. 3 is a schematic view of another embodiment of an excavator constructed in accordance with the present invention.

According to the embodiment of FIG. 3 the elephant trunk is connected by a rotary suction connection 29 to the top of the storage tank 2. A funnel-shaped sheet metal deflector is connected within the tank 2 directly to the elephant trunk opening and terminates in two passage openings, which are alternately closable by means of a flap 30 serving as a flow guidance means. By a partition 28 the settling chamber 2c is subdivided into two container-like portions and the flap 30 directs the suctioned material passing through the elephant trunk 3 into the tank 2 to one or other of the two portions 31 or 32. In the upper area of the two portions 31, 2 is, in each case, provided an outlet 36a, 36b, which can be closed with a pivotable flap 30a or 30b and in their opened state permit the suction air flow to enter the labyrinth-like flow channel 8, 9, 10, which has the construction shown in FIG. 1. The flow channel also contains a filter screen 13, which increases the filtering capacity. After flowing through the labyrinth-like flow channel 8, 9, 10 the suction air flow enters, in the previously described manner, into the fine filter 6b, where the smallest entrained particles are cleaned therefrom. By the chamber 11 and the blowoff box 20 the air passes into the environment.

The two tank portions 31, 32 have at their lower end in each case a closable opening 34 through which the suctioned material which has collected in the particular portion can be discharged onto a conveyor belt 35 located below it. The conveyor belt 35 is arranged in rotary manner, while also being longitudinally and transversely displaceable on the vehicle support and is used for conveying away the separated suctioned material to the left or right side of the vehicle.

If during the operation of the excavator one tank portion 31 has become filled with separated suctioned material, the flap 30 is shifted, so that the suction air flow is directed into the other tank portions 32. During the gradual filling with suctioned material of the tank portion 32 now in operation, the other, filled tank portions 31 can be emptied by opening the opening 34, because the suctioned material drops onto the conveyor belt 35 located below it. When the portion 32 has become filled with suctioned material, the flap 30 is again shifted, so that the suction air flow is again supplied to the other tank portion. As a result of this continuous interaction between the filling and emptying of the individual portions, a continuous suction excavator operation is possible.

I claim:

1. An excavator for removing material by suction, the excavator comprising a pneumatic trunk for removing suctioned material, a storage tank for separating the suctioned material supplied thereto by said trunk, an exhaust fan connected to the storage tank, and a filter positioned between an opening of the trunk into the storage tank and the exhaust fan, wherein the filter means comprises a coarse filter and a fine filter connected thereto, said coarse filter being formed by a labyrinth or cascade flow channel, which is bounded by reciprocally displaced partitions, and wherein a flow cross-section of the coarse filter increases in a suction flow direction through the excavator.

2. An excavator according to claim 1, wherein the reciprocably displaced partitions are substantially vertical and are disposed in parallel to one another.

3. An excavator according to one of claims 1 or 2, wherein the flow channel includes deflections alternately arranged near an upper wall of the storage tank and near to a bottom wall of the storage tank.

4. An excavator according to one of claims 1 or 2, wherein the fine filter includes a plurality of filtering bags through which the suction air flow takes place.

5. An excavator according to claim 4, wherein the filtering bags are substantially vertically oriented and the suction air flow takes place from a bottom of the respective filtering bags to a top of the respective filtering bags.

6. An excavator according to claim 5, wherein the filtering bags are provided at upper ends thereof with at least one of air and water nozzles so as to enable the respective filtering bags to be at least one of rinsed or blown out under pressure.

7. An excavator according to claim 4, wherein the respective filtering bags are fitted to a support frame mounted in a floating manner.

8. An excavator according to claim 7, wherein a vibrating mechanism is provided, said vibrating mechanism being adapted to vibrate the support frame.

9. An excavator according to one of claims 1 or 2, wherein a conveying means is provided on a bottom of the storage tank for enabling suctioned material separated from the suctioned air flow to be removed from the storage tank.

10. An excavator according to claim 9, wherein the conveying means is a screw conveyor.

11. An excavator according to claim 10, wherein the screw conveyor extends substantially in a longitudinal direction of the excavator.

12. An excavator according to claim 10, wherein a conveying-side end of said screw conveyor is associated with an opening in the bottom of the storage tank and, wherein suctioned material is fed by the conveying-side end through the opening end drops onto a further conveying means located below said opening.

13. An excavator according to claim 12, wherein the opening is positioned near a rear end of the storage tank.

14. An excavator according to claim 12, wherein the further conveying means comprises a first conveyor belt.

15. An excavator according to claim 14, wherein a second conveyor belt is provided at a free end of said first conveyor belt, and wherein the suctioned material is transferred from the first conveyor belt to the second conveyor belt.

16. An excavator according to claim 15, wherein the second conveyor belt is one of pivotably fitted to a chassis of the excavator or displaceable relative to the chassis.

17. An excavator according to one of claims 1 or 2, wherein a settling chamber is positioned in the storage tank at a position upstream of the filter means in the storage tank, as viewed in the suction air flow direction.

18. An excavator according to claim 17, wherein the settling chamber is subdivided by a partition into two tank portions, and wherein flow guidance means are provided by which the suction air flow entering the storage tank through an opening of the elephant trunk can be introduced into one or the other of the two tank portions.

19. An excavator according to claim 18, wherein each tank portion is provided at a lower end thereof with a closable opening through which separated suctioned material drops onto a conveying means positioned below said closable opening.

20. An excavator according to claim 19, wherein the conveying means is a conveyor belt.

21. An excavator according to claim 20, wherein the conveyor belt is one of pivotably fitted to a chassis of the excavator or is displaceable relative to the chassis.

* * * * *